(12) United States Patent
Auzillon et al.

(10) Patent No.: US 10,385,700 B2
(45) Date of Patent: Aug. 20, 2019

(54) TURBOMACHINE TURBINE BLADE SQUEALER TIP

(71) Applicant: Safran Aircraft Engines, Paris (FR)

(72) Inventors: Pierre Guillaume Auzillon, Moissy-Cramayel (FR); Remi Philippe Oswald Olive, Moissy-Cramayel (FR); Marjolaine Marie-Anne Pierre, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 314 days.

(21) Appl. No.: 15/501,334

(22) PCT Filed: Aug. 3, 2015

(86) PCT No.: PCT/FR2015/052141
§ 371 (c)(1),
(2) Date: Feb. 2, 2017

(87) PCT Pub. No.: WO2016/020614
PCT Pub. Date: Feb. 11, 2016

(65) Prior Publication Data
US 2017/0226871 A1    Aug. 10, 2017

(30) Foreign Application Priority Data

Aug. 5, 2014 (FR) ...................... 14 57610

(51) Int. Cl.
*F01D 5/20* (2006.01)
*F01D 5/02* (2006.01)

(52) U.S. Cl.
CPC .............. *F01D 5/20* (2013.01); *F01D 5/02* (2013.01); *F05D 2240/307* (2013.01); *F05D 2250/71* (2013.01); *Y02T 50/673* (2013.01)

(58) Field of Classification Search
CPC ........ F01D 5/20; F01D 5/02; F05D 2240/307; F05D 2250/71
(Continued)

(56) References Cited

U.S. PATENT DOCUMENTS 7,686,578 B2 * 3/2010 Klasing .................. F01D 5/187
 415/173.1
8,500,396 B2 * 8/2013 Klasing .................. F01D 5/187
 415/173.1

(Continued)

FOREIGN PATENT DOCUMENTS

JP    2002-227606 A    8/2002
JP    2002-227606 A    8/2002

OTHER PUBLICATIONS

International Search Report dated Oct. 14, 2015 in PCT/FR2015/052141 filed Aug. 3, 2015.

(Continued)

*Primary Examiner* — Mahmoud Gimie
(74) *Attorney, Agent, or Firm* — Oblon, McClelland, Maier & Neustadt, L.L.P.

(57) ABSTRACT

A turbomachine turbine blade includes a suction face, a pressure face, a leading edge and a trailing edge as well as a squealer at the tip thereof. The squealer tip includes at least one internal rib that extends from a point of attachment of the rim of the squealer on the suction-face side to a point of attachment of the rim of the squealer on the pressure-face side, and includes a portion for absorbing the load of leakage flows which extends from the suction face and a deflector-forming portion which extends the load absorber portion with an inflection and guides the leakage flows toward the pressure face.

18 Claims, 4 Drawing Sheets

(58) Field of Classification Search
USPC .................................... 416/228; 415/173.1
See application file for complete search history.

(56) References Cited

U.S. PATENT DOCUMENTS

| | | |
|---|---|---|
| 2008/0044289 A1 | 2/2008 | Klasing et al. |
| 2009/0162200 A1 | 6/2009 | Tibbott et al. |
| 2010/0303625 A1* | 12/2010 | Kuhne .................. F01D 5/20 416/91 |

OTHER PUBLICATIONS

International Search Report dated Oct. 14, 2015 in PCT/FR2015/052141 (with English Translation of Categories of Cited Documents).

French Preliminary Search Report dated Mar. 31, 2015 in FR1457610 (with English Translation of Categories of Cited Documents).

* cited by examiner

TURBOMACHINE TURBINE BLADE SQUEALER TIP

The present invention relates to turbine blades of a turbine engine.

It finds particular advantageous application in the case of high-pressure turbine at the exit of the combustion chamber of a turbojet.

GENERAL TECHNICAL FIELD AND PRIOR ART

Conventionally, between the blades of a turbine of a turbine engine and the inner face of the ring in which said rotor rotates, there is provided a blade tip clearance which allows the rotation of said rotor. Due to the movement of the rotor and the difference in pressure between the lower surface and the upper surface of the blades, leakage flows occur at the clearance between the tip of each of the blades and the inner face of the ring. These flows and the vortices that they create at the upper surface are the source of numerous aerodynamic and aero-thermal problems which directly affect the performance of the turbine engine.

The clearance between the tip of the blades and the inner surface of the ring is generally adjusted so as to reduce these flows. Nevertheless, the reduction in this clearance increases the risk of contacts between the blades and the inner surface of the ring and strongly limits the lifetimes of the blades; in addition it also causes an increase in the temperature of the tip of the blades, which also has an impact on the lifetime of the blades.

To compensate for this disadvantage, it is conventionally known to provide for bathtubs at the tip of the blades, which make it possible to limit the contact surface between the blade and the ring. These bathtubs are generally defined by a rim which delimits a closed contour and which extends, for this purpose, at the tip of the blade, along the upper surface and the lower surface, from the leading edge to the trailing edge.

In particular, configurations with bathtubs intended to make it possible to optimize aerodynamic and aero-thermal performance of the blades have been proposed. In particular, patent applications EP1748153 and WO2009/115728 by the applicant, which propose for example bathtub configurations comprising several cavities or integrating deflectors to guide the leakage flows at the tip of the blade are known.

Up to the present, solutions known in the prior art have, however, proven insufficient, particularly with regard to the performance required of new generation turbojets.

GENERAL PRESENTATION OF THE INVENTION

One general aim of the invention is to improve aerodynamic/aero-thermal performance of turbine blades.

In particular, the invention proposes a bathtub structure at the tip of the blades which allows an increase in the efficiency of the turbine.

It will be noted here that, in the case of turbojets, an increase in the efficiency of the turbines has a direct effect on the efficiency and the specific fuel consumption of the turbojet. That is the reason for which the proposed solution is advantageously applied in the case of turbojet high-pressure turbine blades.

In particular, according to one aspect, the invention consists of a turbine blade of a turbine engine comprising an upper surface, a lower surface, a leading edge and a trailing edge as well as a bathtub at its tip, said bathtub comprising at least one internal rib, characterized in that said rib extends from an attachment point of the rim of said bathtub on the upper surface side to an attachment point of the rim of said bathtub on the lower surface side, and includes a force take-up portion for leakage flows which extends from the upper surface and a portion forming a deflector which extends the force take-up portion with an inflection and guides the leakage flows toward the lower surface.

According to another aspect, a zone of the force take-up portion of the rib which directly faces the leading edge is parallel to the tangent to the leading edge.

According to a supplementary aspect, the angle made by the rib with respect to the normal to the upper surface at the attachment point is comprised between −20° and +20°, preferably between −18° and 3°.

According to an additional aspect, the curvilinear abscissa of the attachment point along the rim of the bathtub on the upper surface side is comprised between 10% and 26%, preferably between 13% and 21%.

According to another aspect, the curvilinear abscissa of the attachment point along the rim of the bathtub on the lower surface side is comprised between 18% and 66%, preferably between 26% and 49%.

According to an elementary aspect, the angle made by the rib with respect to the normal to the lower surface at the attachment point is comprised between 0° and 50°, preferably between 19° and 43°.

According to an additional aspect, the curvilinear abscissa of the point where the rib intersects the camber line of the blade is comprised between 13% and 43%, preferably between 21% and 35%.

According to another aspect, the space between the camber line and the inflection point of the rib is comprised between −0.8 mm and 1.2 mm, preferably between −0.5 mm and 1.2 mm.

DESCRIPTION OF THE FIGURES

Other features, objects and advantages of the present invention will appear upon reading the detailed description hereafter, and with reference to the appended drawings, given by way of non-limiting examples and wherein.

DESCRIPTION OF ONE OR MORE DETAILED EMBODIMENTS

Figure 1:
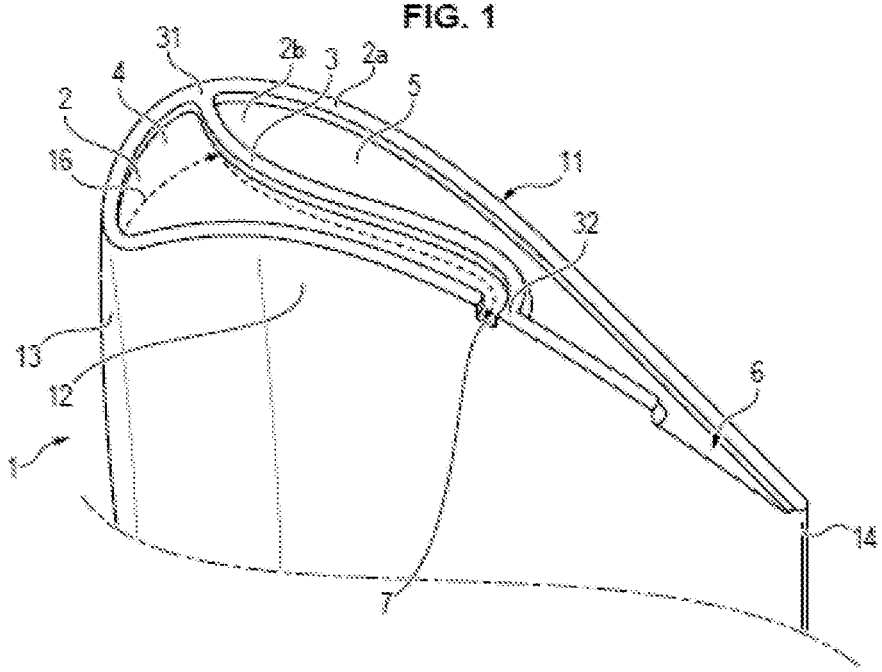
FIG. 1 shows a perspective view of the tip of a blade of an impeller on which a bathtub according to the first embodiment of the invention has been constructed.

Shown in FIG. 1 and the following is a blade 1 of a turbojet high-pressure turbine. In the turbojet, the turbine comprises a disk on which is mounted circumferentially a plurality of blades 1. This disk and the blades are placed inside a ring located downstream of a combustion chamber. The turbine blades and the ring are dimensioned so that the clearance between the ring and the blades is limited.

Such a blade 1 has an aerodynamic profile and has a convex upper surface 11 and a concave lower surface 12 which both extend between, on the one hand, a rounded upstream edge which forms a leading edge 13 and, on the other hand, a trailing edge 14.

At its tip, intended to face the inner face of the ring, the blade 1 has a bathtub 2 defined by a rim 2a which borders the bottom 2b of said bathtub by extending along the upper surface 11 and the lower surface 12, from the leading edge 13 to the trailing edge 14.

The interior of said bathtub 2 is divided into two cavities 4 and 5 by a rib 3 which has the same height as the rim 2a.

Figure 2:
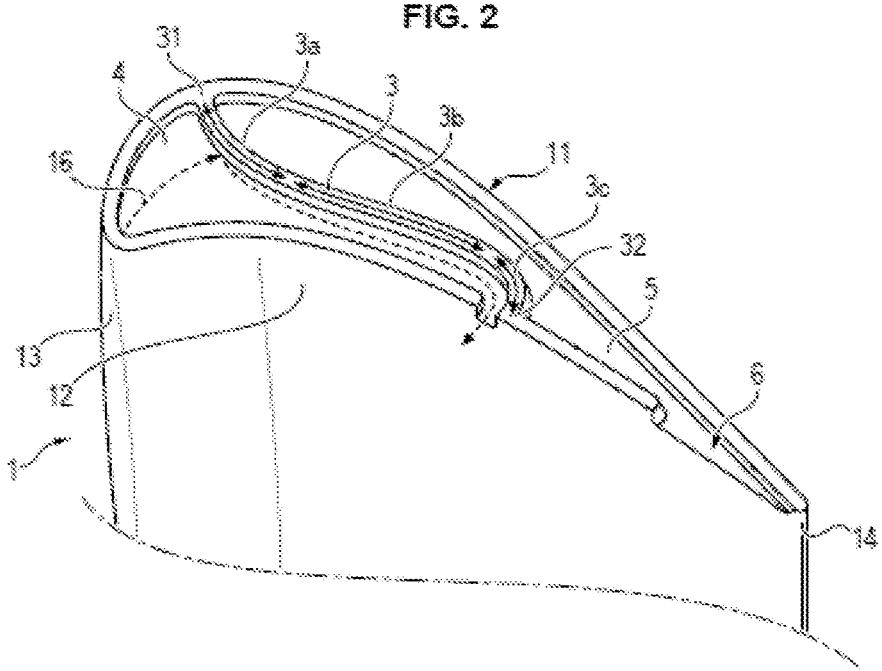
FIG. 2 shows the same view of the first embodiment of the invention as in FIG. 1, this figure emphasizing the different portions of the groove.

This rib 3, as shown in FIG. 2, extends between an attachment point 31 located on the portion of this rim 2a which runs along the upper surface 11 and a point 32 located on the portion of this rim 2a which runs along the lower surface 12. It has:
- a portion 3a which extends from the upper surface 11 and which creates an obstacle to leakage flows 16 which arrive inside the cavity 4 through the leading edge 13;
- a portion 3b which extends the portion 3a with an inflection and which serves as a deflector for guiding the exit of leakage flows on the lower surface side.

Such a rib 3 makes it possible to recover a portion of the load force of the leakage flows 16 which press against said rib 3; it also allows a reduction of the temperature at the tip of the blade 1 and of the ring by preventing hot air from penetrating over the entire bathtub 2, which contributes to increasing the lifetime of the blade 1.

In particular, so as to maximize the load force recovery, the zone of the portion 3a of the rib 3 which directly faces the leading edge 13 (zone of the portion 3a closest to it) is parallel to the tangent to the leading edge 13, so as to be perpendicular to the direction of leakage flows 16 entering through said leading edge 13.

The portion 3a thus recovers maximum force.

Figure 3:
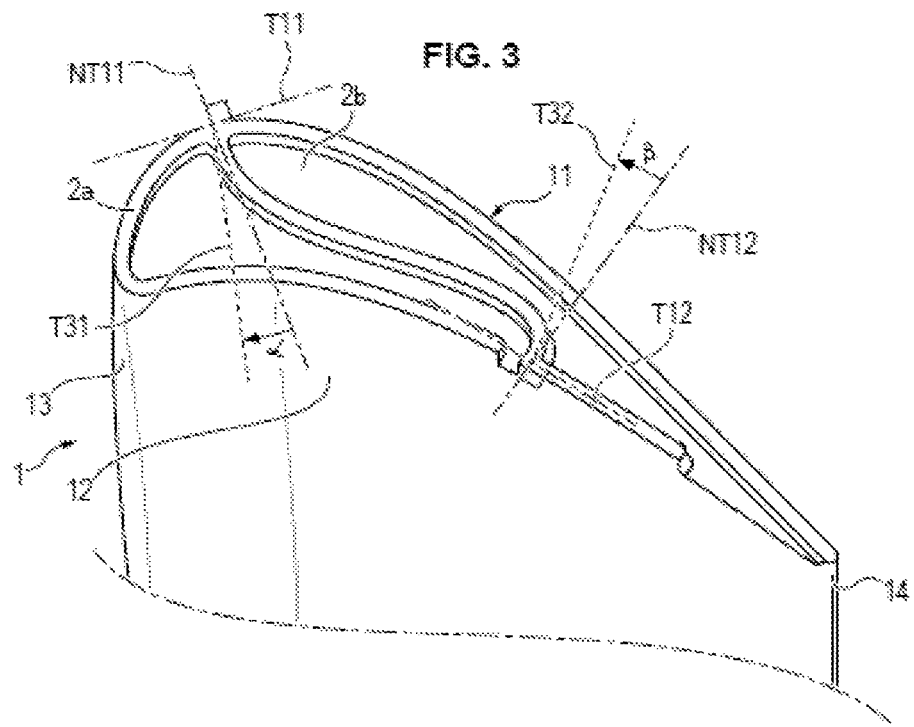
FIG. 3 shows the same view of the first embodiment of the invention as in FIGS. 1 and 2, this figure allowing emphasis on the direction of the rib at the lower surface and the upper surface.

The orientation of the rib 3 at the attachment point 31 is also optimized. In particular, the angle made by the rib 3 with respect to the perpendicular to the upper surface 11 at the attachment point 31 (in FIG. 3, the angle α between the tangent T31 and the normal NT11 perpendicular to the tangent T11 to the upper surface 11 at point 31) is advantageously comprised between −20° and +20°, more advantageously between −18° and 3°, and even more advantageously between −16° and −14° (the sign of the angle α being determined in the trigonometric sense, from the normal NT11 toward the tangent T31).

The position of the attachment point 31 on the upper surface 11 is a compromise which is chosen to optimize the force take-up of the leakage flows while avoiding or limiting the passage of hot air above the rib 3. It is understood, in fact, that the closer the attachment point 31 is to the leading edge 13, the more there exists a risk that a portion of the leakage flow passes over the rib 3, into the cavity 5, so that the efficiency of force take-up would not be optimal.

Figure 4:
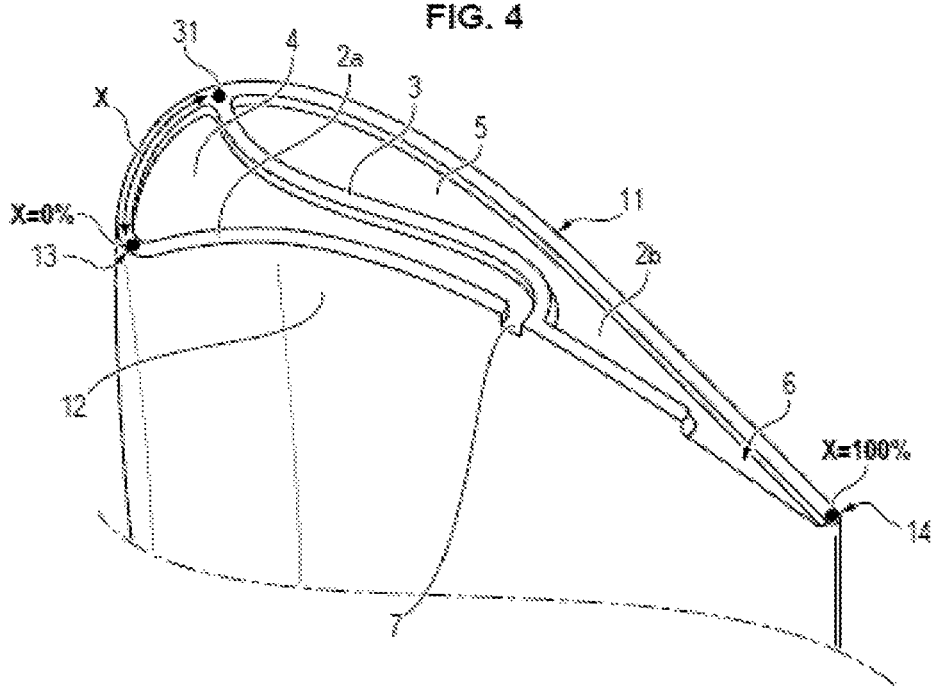
FIG. 4 shows the same view of the first embodiment of the invention as in FIGS. 1 to 3, this figure allowing emphasis on the position of the connection point between the rib and the upper surface.

The curvilinear position of the attachment point 31 along the upper surface line (curvilinear abscissa X in FIG. 4—determined between the leading edge 13 (X=0%) and the trailing edge 14 (X=100%)) is consequently preferably comprised between 10% and 26%, more preferably between 13% and 21%, and even more preferably between 15% and 17%.

Moreover, beyond the zone of the portion 3a which faces the leading edge 13 and where the flow rate of the leakage flows impinges against the rib 3, the rib 3 is inflected and is extended by the portion 3b which serves as a deflector. This portion 3b which serves to guide the leakage flows is oriented so that said leakage flows leave the lower surface 12 while being as parallel as possible with the main flow along the lower surface 12.

Figure 5:
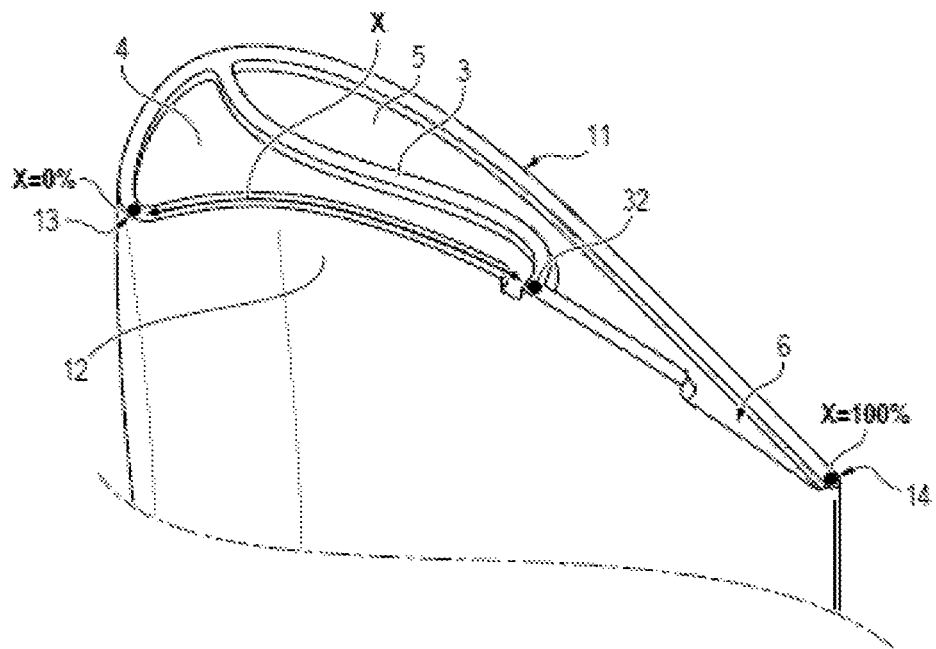
FIG. 5 shows the same view of the first embodiment of the invention as in FIGS. 1 to 4, this figure allowing emphasis on the position of the connection point between the rib and the lower surface.

To this end, the attachment point 32 is positioned along the lower surface 12 while being offset toward the trailing edge 14. The curvilinear position of this attachment point 32 along the line of the lower surface (abscissa X in FIG. 5—determined between the leading edge 13 (X=0%) and the trailing edge 14 (X=100%)) is preferably comprised between 18% and 66%, advantageously between 26% and 49%, and even more advantageously between 32% and 36%.

It will be noted here that the closer the attachment point 32 is to the trailing edge 14 the more the leakage flow present in the cavity is guided to leave parallel to the main flow along the lower surface, which is favorable to the efficiency of the blade. On the other hand, the hot air remains longer in the cavity 4, which is unfavorable in terms of lifetime for the blade. The ranges given above for the values of the curvilinear abscissas of the point 32 make possible good compromises between aerodynamic and aero-thermal properties of the blade 1.

The fact that the rib 3 comprises an inflection point allows, on the one hand, the force take-up portion 3a to be at a distance from the leading edge 13 and to have a direction for which the load force recovery is the greatest possible; and on the other hand the portion 3b which serves as a deflector to be at a distance from the wall of the lower surface 12 and to have a direction allowing optimization of the aerodynamic and aero-thermal properties of the blade 1. It is the inflection of the rib 3 which makes it possible to obtain, in a single rib, a shape which provides a compromise between the different possible shapes of internal ribs which optimize only one parameter of the blade 1, to the detriment of other parameters.

The orientation of the rib 3 at the attachment point 32 can also be optimized, in particular to allow release of the bathtub 2 from the mold in the case of manufacture of the blade by casting (lost wax casting). That is the reason for which the rib 3 has, at the attachment point, a portion 3c which is itself inflected with respect to the portion 3b which forms a deflector in the extension of the portion 3a. The angle made by this portion 3c with respect to the perpendicular to the lower surface 12 (in FIG. 3, the angle β between the tangent T32 and the normal NT12 perpendicular to the tangent T12 of the lower surface 13 at the point 32) is advantageously comprised between 0° and 50°, preferably between 19° and 43°, and even more preferably between 35° and 40° (the sign of the angle β being determined in the trigonometric sense, from the normal NT12 toward the tangent T32).

The optimization of the shape of the rib 3 can also take into account the means by which it extends with respect to the camber line of the blade 1.

Figure 6:
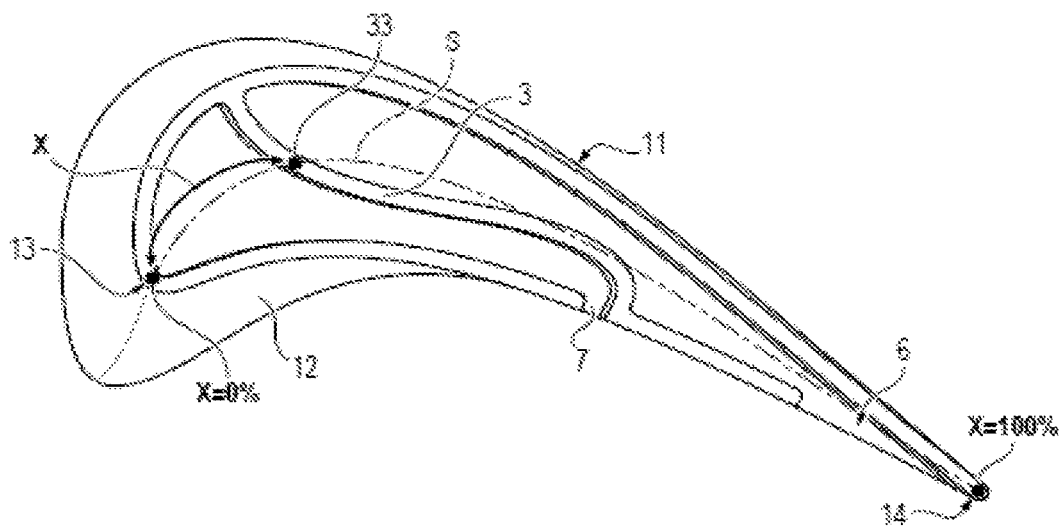
FIG. 6 shows a view from above of the blade according to the first embodiment of the invention.

In particular, as shown in FIG. 6, the position of the point 33 where the rib 3 intersects the camber line S of the blade 1 is preferably comprised between 13% and 43%, preferably between 21% and 35%, and more preferably between 25% and 29% (in FIG. 6, the abscissa X along the camber line S-determined between the leading edge 13 (X=0%) and the trailing edge 14 (X=100%)).

The camber line S is the line which consists of the set of points equidistant from the lower surface 12 and the upper surface 11.

Figure 7:
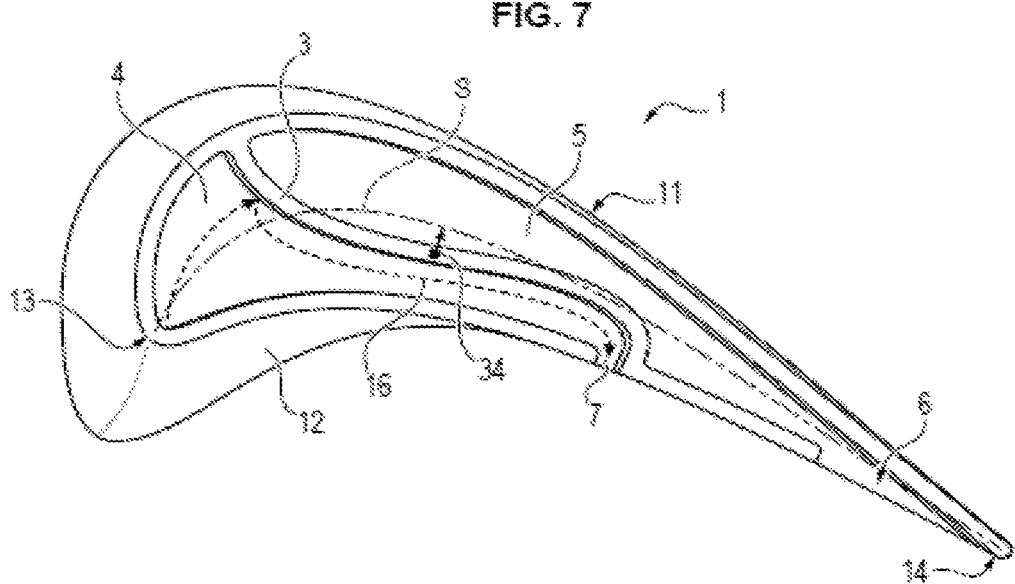
FIG. 7 shows the same view as in FIG. 6, this figure allowing emphasis on the space between the inflection point of the rib and the camber line of the blade.

Moreover, the space between the camber line S and the inflection point 34 of the rib 3 can be optimized (FIG. 7) so as to be comprised between −0.8 mm and 1.2 mm, preferably between −0.5 mm and 1.2 mm, and even more preferably between 1.1 mm et 1.2 mm (the sign of the distance being positive when the inflection point 34 is between the camber line S and the lower surface 12, negative otherwise).

Figure 8:
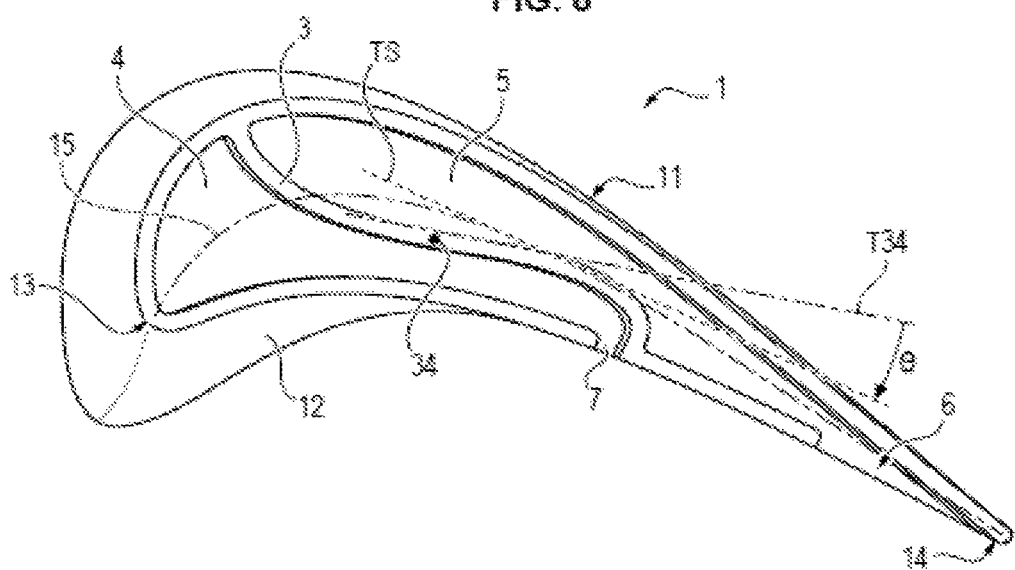
FIG. 8 shows the same view as in FIGS. 6 and 7, this figure allowing emphasis on the direction of the rib at its inflection point.

The orientation of the portion 3b can also be optimized. The angle θ formed by the tangent T34 (FIG. 8) of the rib 3 at the inflection point 34 and the tangent TS of the camber line S at the intersection point between the tangent T34 and the camber line S is comprised, to this end, between −20° and +20°, preferably between −15.4° and +5.1°, and more preferably between −10.8° and −9.7° (the sign of the angle θ being defined in the trigonometric sense, from the tangent T34 toward the tangent TS).

Moreover, openings 6 and 7 can also be provided at the rim 2a, on the side of the lower surface 12, to facilitate the exhaust of hot air in the cavities 4 and 5. The opening 6 of the cavity 4 is for example in direct proximity to the rib 3, while the opening 7 of the cavity 5 is in direct proximity to the trailing edge 14.

The invention claimed is:

1. A turbine blade of a turbine engine comprising:
an upper surface, a lower surface, a leading edge and a trailing edge as well as a bathtub at its tip, said bathtub comprising at least one internal rib, wherein said rib extends from an attachment point of the rim of said bathtub on the upper surface side to an attachment point of the rim of said bathtub on the lower surface side, and includes a force take-up portion for leakage flows which extends from the upper surface and a portion forming a deflector which extends the force take-up portion with an inflection and guides the leakage flows toward the lower surface.

2. The blade according to claim 1, wherein a zone of the force take-up portion of the rib which directly faces the leading edge is parallel to the tangent to the leading edge.

3. The blade according to claim 1, wherein an angle (a) made by the rib with respect to the normal (NT11) to the upper surface at the attachment point is comprised between −20° and +20°.

4. The blade according to claim 1, wherein a curvilinear abscissa of the attachment point along the rim of the bathtub on the upper surface side is comprised between 10% and 26%.

5. The blade according to claim 1, wherein a curvilinear abscissa of the attachment point along the rim of the bathtub on the lower surface side is comprised between 18% and 66%.

6. The blade according to claim 1, wherein an angle (β) made by the rib with respect to the perpendicular (NT12) to the lower surface at the attachment point is comprised between 0° and 50°.

7. The blade according to claim 1, wherein a curvilinear abscissa of the point where the rib intersects a camber line of the blade is comprised between 13% and 43%.

8. The blade according to claim 1, wherein a space between a camber line and the inflection point of the rib is comprised between 0.8 mm and 1.2 mm.

9. A turbine disk, comprising:
a plurality of the blade according to claim 1.

10. A turbojet high-pressure turbine, comprising:
a plurality of the blade according to claim 1.

11. The blade according to claim 3, wherein the angle (α) is comprised between −18° and +3°.

12. The blade according to claim 4, wherein the curvilinear abscissa is comprised between 13% and 21%.

13. The blade according to claim 5, wherein the curvilinear abscissa is comprised between 26% and 49%.

14. The blade according to claim 6, wherein the angle (β) is comprised between 19° and 43°.

15. The blade according to claim 7, wherein the curvilinear abscissa is comprised between 21% and 35%.

16. The blade according to claim 8, wherein the space is comprised between −0.5 mm and 1.2 mm.

17. A turbine blade mounted to a disk of a turbine engine and extending to a ring of the turbine engine while defining a clearance between the ring and a tip of the turbine blade, comprising:
an upper surface,
a lower surface,
a leading edge,
a trailing edge,
a bathtub at the tip, the bathtub having a rim at the periphery thereof, the rim having portions coplanar with the upper surface and with the lower surface,
at least one internal rib in said bathtub, wherein said internal rib extends from an attachment point to the portion of the rim coplanar with the upper surface to an attachment point of the portion of the rim coplanar with the lower surface,
and wherein the internal rib includes a force take-up portion for leakage flows, which force take-up portion extends from the upper surface, and a portion having an inflection and forming a deflector which extends the force take-up portion and guides the leakage flows toward the lower surface.

18. The blade according to claim 17, wherein a zone of the force take-up portion of the rib which directly faces the leading edge is parallel to the tangent to the leading edge.

* * * * *

UNITED STATES PATENT AND TRADEMARK OFFICE
CERTIFICATE OF CORRECTION

| | | |
|---|---|---|
| PATENT NO. | : 10,385,700 B2 | Page 1 of 1 |
| APPLICATION NO. | : 15/501334 | |
| DATED | : August 20, 2019 | |
| INVENTOR(S) | : Pierre Guillaume Auzillon et al. | |

It is certified that error appears in the above-identified patent and that said Letters Patent is hereby corrected as shown below:

In the Claims

In Column 5, Line 49 (approx.), Claim 3, delete "(a)" and insert -- (α) --.

In Column 6, Line 14 (approx.), Claim 8, change "0.8 mm" to -- -0.8 mm --.

Signed and Sealed this
Twenty-first Day of April, 2020

Andrei Iancu
*Director of the United States Patent and Trademark Office*